United States Patent Office 3,203,034
Patented Aug. 31, 1965

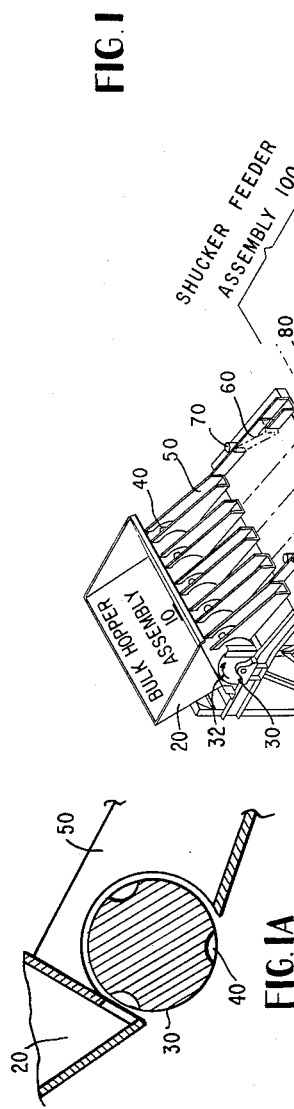

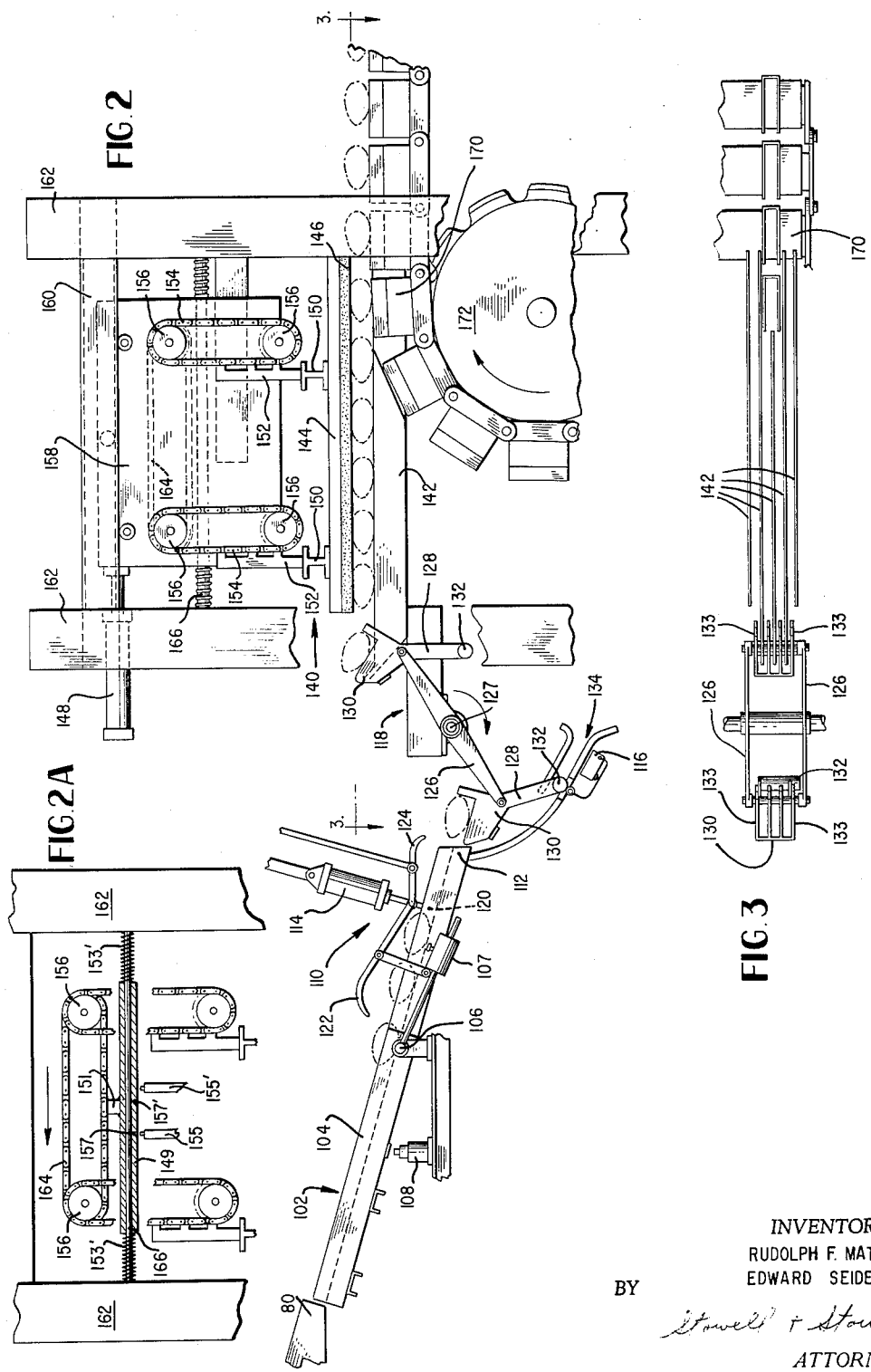

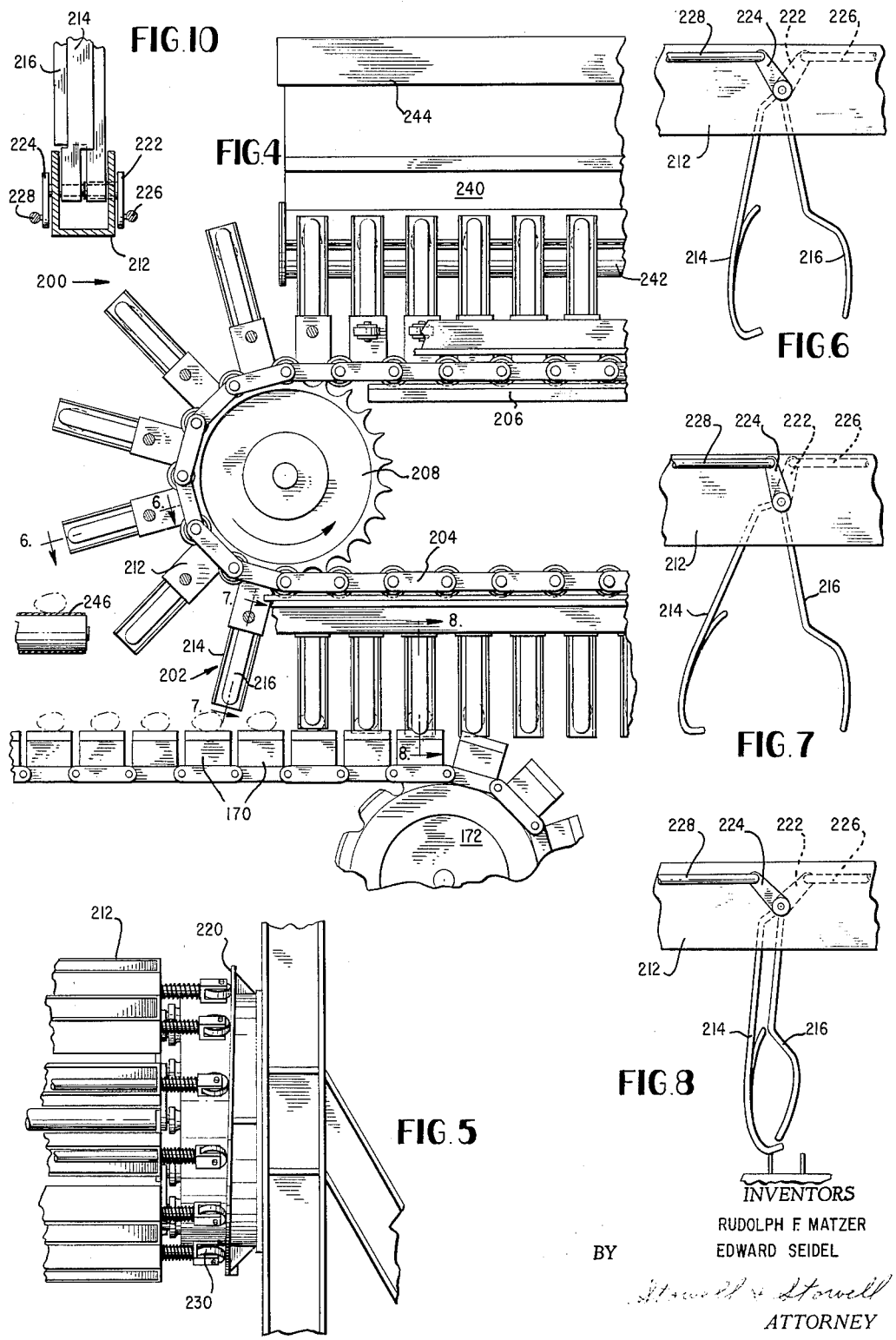

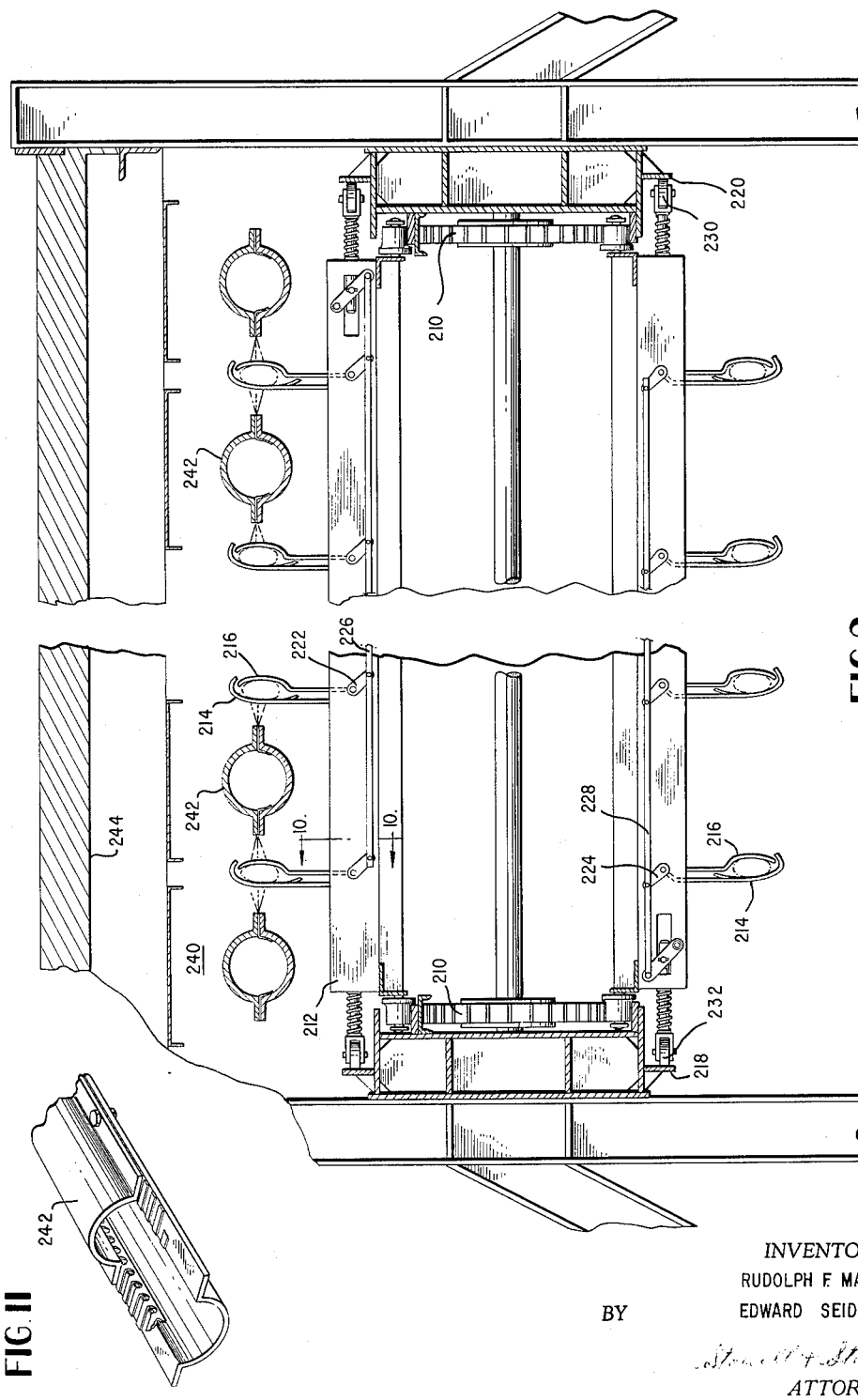

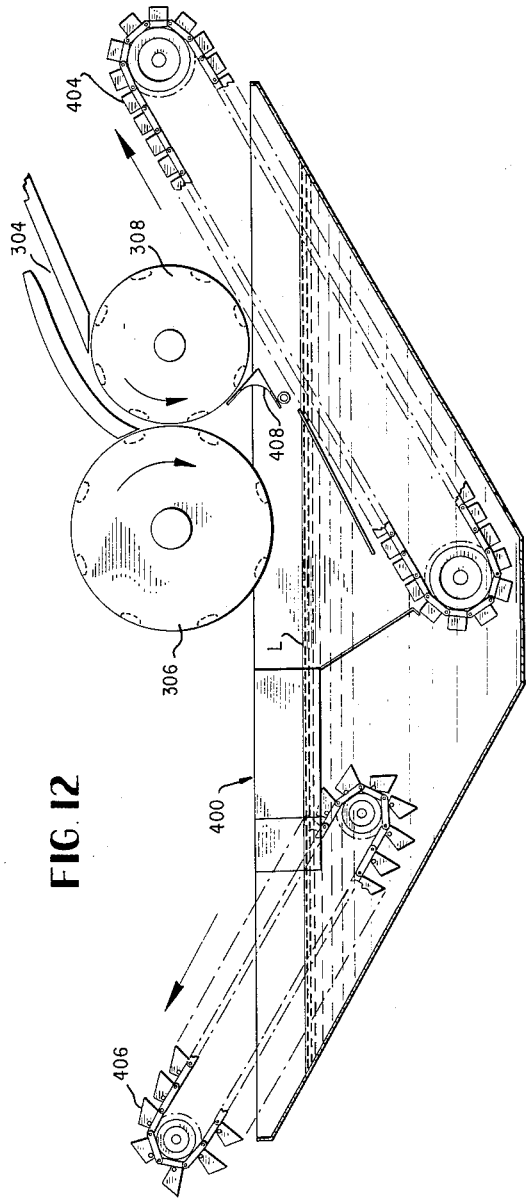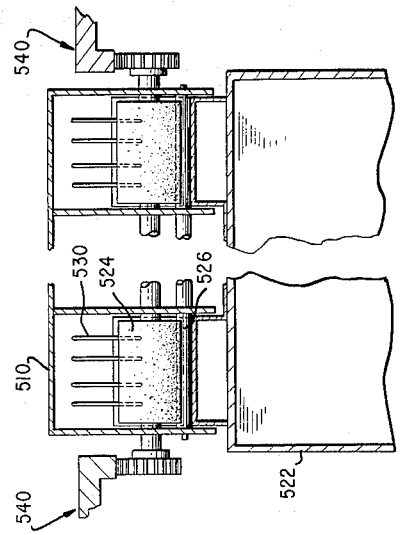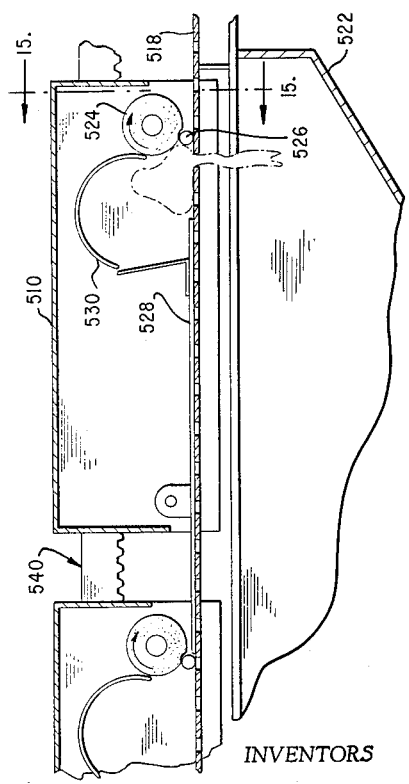

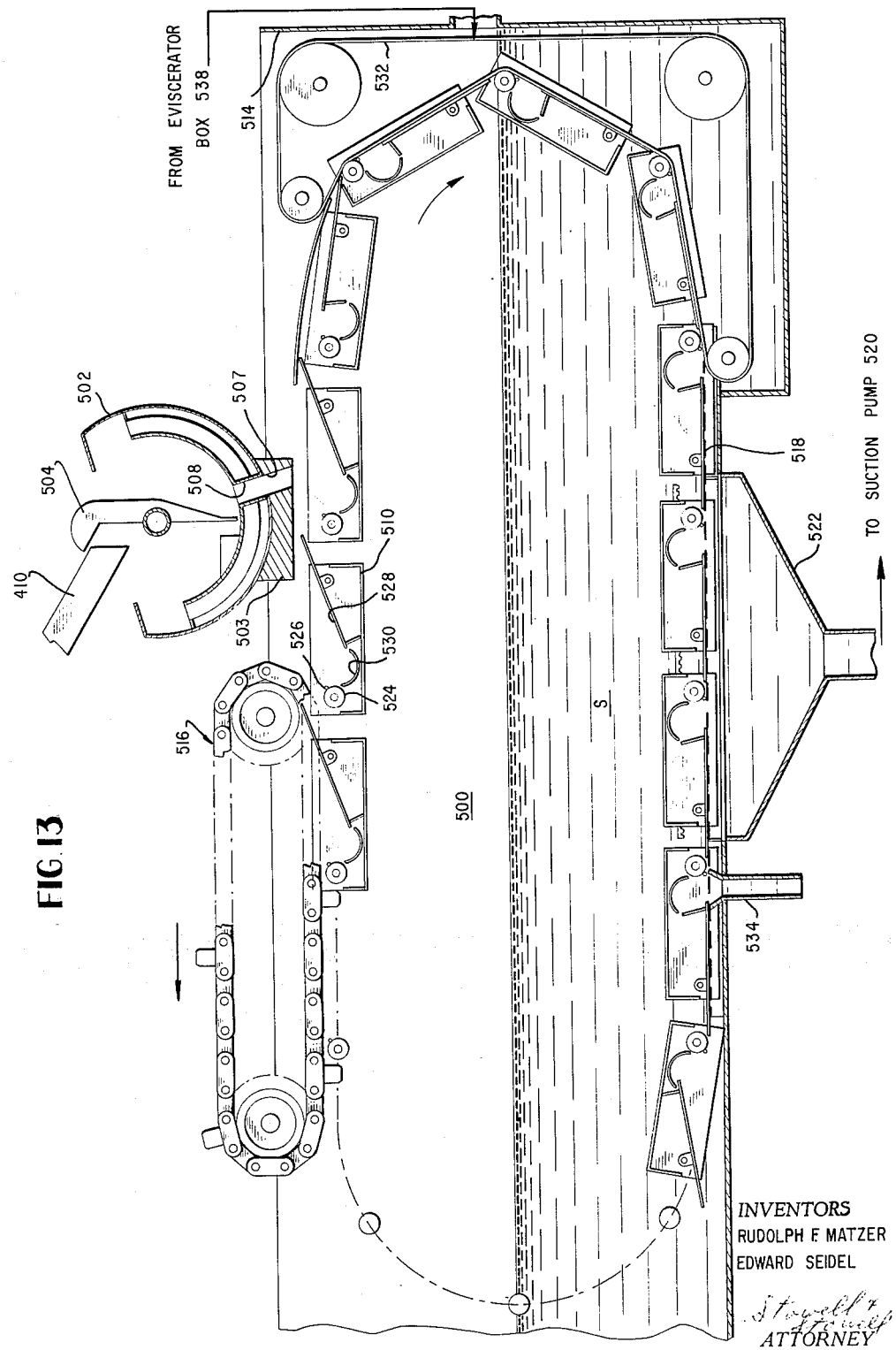

3,203,034
MATERIAL HANDLING APPARATUS
Rudolph F. Matzer, 13229 Fort Caroline Road, and Edward Seidel, 5241 Damascus Road, both of Jacksonville 7, Fla.
Filed Oct. 25, 1962, Ser. No. 233,039
1 Claim. (Cl. 17—2)

The present invention relates to an apparatus for shucking and eviscerating various types of bivalve mollusks.

In its broader aspects the invention comprises apparatus for sequentially shucking and eviscerating bivalves comprising means for conveying bivalves from a random supply, means for segregating and orienting the bivalves, means for directing heat to predetermined zones of the segregated and oriented bivalves, means for removing and segregating the adductor muscle and the viscera from the shell of the bivalves, and means for removing and segregating the viscera from the adductor muscle of the bivalves.

It is an object of the present invention to produce an apparatus which is particularly adapted to economically shuck and eviscerate the bivalve species known generically as *Pecten irradians* which is typically found along the coast from Nova Scotia to Texas. More specifically, the invention has been found to be useful in shucking and eviscerating the pecten known as the calico scallop (*Pecten gibbus*). Although other parts of the pectens are edible, it is only the single, large adductor muscle, which closes the shell, that is marketed as the scallop.

Other objects and advantages of the invention will be more clearly understood from considering the following detailed description of a preferred embodiment of the invention in connection with the attached drawings, in which:

FIG. 1 is a perspective view of apparatus embodying features of the invention;

FIG. 1a is a fragmentary enlarged sectional view illustrating details of the hopper and drum feeder shown in FIG. 1;

FIG. 2 is an elevational view on an enlarged scale of a portion of the shucker feeder assembly which controls the feed of the bivalves from the supply hopper to the shucker proper;

FIG. 2a is a fragmentary sectional view of a portion of the shucker feeder assembly shown in FIG. 2;

FIG. 3 is a sectional view of a reciprocating feeder portion of shucker feeder assembly taken along line 3—3 of FIG. 2;

FIG. 4 is a fragmentary elevational view on an enlarged scale of the shucker assembly illustrating the cup-mechanism for picking up the bivalves from the shucker feeder assembly to be fed to the shucking furnace, and the point at which the shucked bivalves are dropped onto a transporting conveyor for conveying the same to a pair of cooperating crusher cylinders;

FIG. 5 is an end view of the shucker assembly illustrating the camming apparatus employed to control the opening and closing of mechanism for transporting the bivalves through the shucking furnace;

FIG. 6 is a side elevation view on a greatly enlarged scale of the cup mechanism taken along line 6—6 of FIG. 4 showing the cup mechanism in position after releasing a shucked bivalve;

FIG. 7 is a side elevation view similar to FIG. 6 taken along line 7—7 of FIG. 4 showing the cup mechanism in a position preparatory to grasping the bivalve;

FIG. 8 is a side elevation view similar to FIGS. 6 and 7 and is taken along line 8—8 of FIG. 4 showing the cup mechanism in its closed bivalve holding position;

FIG. 9 is a sectional view of the shucker assembly taken along line 9—9 of FIG. 1 on an enlarged scale with portions broken away;

FIG. 10 is a sectional view on an enlarged scale of the cup mechanism taken along line 10—10 of FIG. 9;

FIG. 11 is a fragmentary partially broken away view of a burner unit of the shucker furnace;

FIG. 12 is an elevational view partially in section of the crusher assembly of the apparatus showing the brine separation tank;

FIG. 13 is a rear elevational view partially in section of the eviscerator portion of the assembly;

FIG. 14 is an enlarged fragmentary view partly in section of the portion of the eviscerator illustrated in FIGS. 1 and 13 illustrating the mechanism for separating the viscera from the adductor muscle of the bivalve mollusk; and FIG. 15 is a fragmentary sectional view of the eviscerator taken along line 15—15 of FIG. 14.

Referring to FIG. 1, there is shown a complete overall view of the apparatus embodying the principles of the invention. In order to clearly understand the overall operation and function of the apparatus, a brief description will be herein set forth of the flow of the product through the apparatus.

Initially, the bivalves, for example, scallops, are fed into the bulk hopper 10 which will feed the bivalves to the shucker feeder assembly 100 in a series of parallel feed lines.

The shucker feeder assembly 100 receives the bivalves from the bulk hopper 10 and associated cylindrical feeder and effectively controls the output of the hopper and spaces the bivalves precisely for loading on to the shucker 200.

The shucker 200 receives the bivalves from the shucker feeder assembly 100, effectuates a release of the adductor muscle of the bivalve from its shell and then delivers the released shell and meats to the crusher assembly 300.

The crusher assembly 300 receives the released bivalves from the shucker and mechanically shears the shells thereof in preparation for separation in the brine separation tank 400.

The brine separation tank 400 receives the meats and the shells of the bivalve from the crusher assembly 300, separates them by means of differences in specific gravity, then delivers the shells to an area convenient for removal and delivers the meats to the eviscerator 500.

The eviscerator 500 receives the meat of the bivalves (consisting of the adductor muscles and viscera) from the brine separation tank 400 and then separates the adductor muscle from the viscera.

Having generally described the flow of the products, a detailed description of the various subassemblies will follow.

The bulk hopper assembly 10 includes a hopper 20 having a generally V-shaped cross section which serves as a storage hopper for the raw bivalves. The bottom of the hopper 20 is open at one portion 22 adjacent a drum feeder 30, as shown in FIGS 1 and 1a. The drum feeder 30 has on its periphery indented integral cups 40. The drum rotates in the clockwise direction indicated by the arrow 32 in FIG. 1 and individual bivalves drop into respective cups and are propelled into the guide chutes 50 by the force of gravity as the drum 30 carries each such cup 40 to a "3 o'clock" position, as viewed in FIG. 1a.

It will be noted that there are typically a plurality of parallel paths of travel which the bivalves will take. For purposes of clarity, in general, only a single one of these paths is described in detail since all are substantially identical with one another.

From the guide chutes 50, the bivalves pass through a power driven gate mechanism 60. Each of the individual gate mechanisms 60 is operated by the electric motor 70. Each of the gates has two operative positions. When open, as shown in full line, the gate allows the bivalves to pass to a funnel element 80 and when closed, as shown in dashed line, the gate causes the bivalves to bypass the funnel element 80 and fall on to the conveyor 90 which returns the bivalve to the bulk hopper 20. The switches controlling the operation of the respective gate mechanisms 60 are mounted under sensing elements of the shucker feeder assembly 100 and will be clearly defined hereinafter.

When the gate mechanisms 60 are in an open position, the bivalves are dropped into their respective funnels 80. The shape and declivity of the funnels guide and de-accelerate the travel of the bivalves. From these funnels, the bivalves slide on to sensing elements 102 of the shucker feeder assembly 100. The function of the sensing elements 102 is to sense a predetermined weight of bivalves on a counter-balanced arm 104 and when a sufficiency of bivalves is on the arm 104, the arm pivots about a pivot 106 and lowers, against the weight of the counterweight 107, causing switch 108 to close and operate, preferably after a delay of from 4 to 6 seconds the gate 60. Thus, the sensing elements 102 control the amount of bivalves entering a second gating mechanism 110.

The gating mechanism 110, illustrated in FIG. 2, includes an air operated, electrically controlled metering linkage assembly which allows only one bivalve to pass at one time. A guide 112 disposed under the gating mechanism 110 is preferably formed of flat stainless steel bars placed on edge which provides a low friction system of transporting the bivalves. The gating mechanism 110 is operated by the air cylinder 114, which, in turn, is triggered by a switch 116 located under a rotary transfer conveyor 118. Each downward stroke of the cylinder 114 allows only one bivalve to pass on to the next component, thus giving accurate and timed delivery of the bivalve to the next component of the system.

It will be noted that as the cylinder 114 is caused to make a downward stroke, the lower end of the piston rod 120 blocks the travel of the bivalves through the guide 112, while the pivotal linkage member 122 permits passage of the bivalves to enter the space between the piston rod 120 and the inlet end of the guide 112, and the associated pivotal linkage 124 permits the travel of a single bivalve to pass through the outlet end of the guide 112.

At this point in the system, there are a number of methods of loading the shucker. One of the preferred methods is illustrated and described. The bivalve which has passed through the outlet end of the guide 112 is loaded on the rotary transfer conveyor 118. The rotary conveyor 118 is suitably driven by an electric motor, for example, which is synchronized with the stroke of reciprocating feeder 140. The rotary conveyor 118 consists of a pair of spaced arms 126 which are keyed or otherwise affixed to the armature shaft 127 of the drive motor, not shown. At opposite ends of the arms 126, there are pivotally mounted cup members 128. The upper portion 130 of the cup member 128 is adapted to receive a bivalve and transfer the same to the reciprocating feeder 140. The upper portion 130 of the cup member 128 is provided with a plurality of parallel arranged fingers 133. The cup members 128 are counterweighted at 132 and operate the switch 116 hereinbefore described. It will be noted that a guide assembly 134 having a flared inlet section receives the counterweight 132 which effectively actuates the switch 116 as it travels through the guide assembly.

The bivalves are then transferred to the reciprocating feeder 140 which includes a plurality of spaced stationary rails 142 between which the fingers 133 of the rotary conveyor 118 are adapted to pass and release the bivalve to rest on the rails 142. The reciprocating feeder 140 also includes a horizontally extending rail member 144 carrying a soft rubber or neoprene foam pad 146 for compensating for variations in bivalve sizes and also to provide traction. Reciprocating, lifting and downward movements of the rail members 144 are effected by the cooperative actuation of air cylinder 148 and spring actuated sleeve 149. The rail members 144 are tied together by transversely extending spaced apart top rails 150 which, in turn, have vertically extending integral bars 152. The bars 152 are adapted to engage to respective roller chains 154 which travel about a pair of spaced apart sprockets 156. The sprockets 156 are rotatably mounted on a carriage element 158 which is slidably mounted between a pair of rails 160 supported by upright journals 162. A roller chain assembly 164 is mounted about a pair of spaced sprockets which are keyed to the same shafts as the uppermost sprockets 156. The assembly also includes a bar 166, supported at opposite ends in vertical frame members 162, which bar slidably mounts sleeve 149. The sleeve 149 is, in turn, connected by bracket 151 to chain 164. The sleeve is biased toward a center position on rod 166 by spring means 153 and 153'. Solenoid-actuated latch means 155 and 155' are adapted to alternately engage openings 157 and 157' in the sleeve 149. In operation of the mechanism with the carriage urged to the left in FIG. 2 and latch means 155' in engagement with opening 157' pressure fluid directed to the left end of cylinder 148 will move the carriage 158, the rail members 144 and the sleeve 149 to the right, thereby compressing spring 153'. At the end of the piston stroke suitable switch means are actuated to cut off pressure fluid to the cylinder 148, de-energizing solenoid-actuated latch means 155' and energizing solenoid actuated latch means 155.

As soon as latch means 155' is deenergized, spring 155' moves sleeve 149 to the left until latch means 155 stops further movement by engaging opening 157 in the sleeve. As the sleeve moves to the left, the lower flight of chain 164 moves to the left which, in turn, rotates sprockets 156 and lifts rail members 150 and 144 whereby pad 146 is moved out of engagement with the bivalves.

Pressure fluid directed to the right hand end of cylinder 148 moves the carriage 158 to the left while the pad 146 is out of engagement with the bivalves. The leftward movement of the carriage and sleeve 149 compresses spring 153 whereby when further switch means are engaged at the end of the piston stroke, solenoid 155 is de-energized and sleeve 149 is urged to the right by spring 153 and in so moving urges the lower flight of chain 164 to the right causing pad 146 to reengage the bivalves. Repetition of this cycle causes step-by-step movement of the bivalves onto conveyor 170.

The reciprocating feeder 140 places the bivalves on moving conveyor elements 170 which are serially connected together to form a chain which may be driven by rollers 172 which operate in synchronous speed with the main shucker conveyor of the next succeeding assembly, the shucker assembly 200.

The bivalves are picked up from the conveyor element 170 by a shucker cup 202 illustrated in FIG. 4. The shucker 200 consists of a pair of roller chains 204 mounted on a pair of tracks 206, and driven by a sprocket drive 208. An idler 210 is used for slack take-up. Mounted transversely across the chains 204 is the carrier member 212 which forms a support for the shucker cups 202 and their operating assembly. It can be seen that the position of the cups is controlled by bell-crank type of mechanism, illustrated in FIGS. 6–10, which is, in turn, positioned by the roller caster or cam member, as illustrated in FIGS. 5 and 9, riding on an associated operating rail. More particularly, the cups 214–216 of the shucker 200 are positioned at any particular point in the chain travel by simply setting the distance in or out of the operating rails 218 and 220. Each of the cup members 214 and 216 have bell cranks 222 and 224, respectively, operatively connected to spring biased linkages 226 and 228, respectively. The linkages 226 and 228 are respectively connected to roller casters or cam members 230 and 232 which affect an opening or closing of the cup members. By this means, the cup members 214 and 216 are caused to operate in such a manner as to pick up the bivalve from the conveyor elements 170, turn the bivalve into a vertical position, and transport the bivalve through a shucker oven 240 in a controlled attitude and speed. The shucker oven 240 consists of burner assemblies 242 mounted horizontally in such a manner as to impinge the hottest portion of the flame configuration on the bivalve's adductor muscle attachment area. The burners 242 produce flat intense flames which emanate through a plurality of jets formed therein and extend the full length of the oven. An insulated cover acts as a breech for the induced draft fan 246. The cups 202 open at the end of the travel through the oven 240 and drop the treated bivalve on to the traversing conveyor belt 246.

The traversing conveyor 246 transports the bivalves from the discharge of the shucker 200 to the rotary discharger 302. The discharger 302 is a paddle wheel which wipes the shucked bivalve into the guides 304 which feed a pair of cooperating crusher cylinders 306 and 308. The crushers 300 consists of two cylinders 306 and 308 of slightly different diameters rotating at the same r.p.m. The faces of each of the rollers have indentations of a size to accommodate the bivalve being processed. By having two different diameter rollers operating in this manner, it can be seen that a shearing action is accomplished by means of the opposite cups being out of phase with each other.

The discharge from the crusher 300 is thrown into the brine tank 400 in which the brine level L and the density are maintained at a predetermined constant. The level L of the liquid within the brine tank 400 may be maintained constant by a thermister inserted at the design water line, and controlling an associated vacuum tube amplifier circuit, not shown, which in turn controls an electrical solenoid valve in an external fresh water supply. The shells and other solid matter settle to the bottom of the tank 400 and are then lifted out of the tank by means of the shell conveyor 404. The adductor muscle and its attached viscera float on the surface of the brine and are guided to the meats conveyor 406 by means of water spray 408. A pump 402, illustrated in FIG. 1, provides water jets as a propellant to convey the meats across the surface of the brine towards the meat conveyor 406. Suitable means may also be provided to determine and control the salinity of the brine within the tank 400. The meats conveyor 406 then lifts the product up to the discharge pan 410 located above the eviscerator supply trough 502.

Discharge pan 410 contains both the meats and a relatively large amount of replenishment water for tank 500. The meats and water slide down pan 410 and drop into one side of the eviscerator supply trough 502 which is mounted on a shaft and bearings and is driven about its axis by an air cylinder 506, illustrated in FIG. 1, approximately 20° each side of center. A stationary divider member 504 is mounted to extend vertically through the entire length of the trough 502. The trough 502 is provided with a plurality of outlet ports 508. A close-fitting outlet member 503 provided with a plurality of outlet ports 507 is disposed beneath the trough 502. When the air cylinder 506 is in "in" stroke, ports 508 of the trough 502 and the ports 507 of the member 503 are in alignment and one meat drops through to an eviscerator container 510. On the "out" stroke, port 508 is to the left of the stationary divider 504. Port 507 is closed, conserving water, and one meat collects in port 508. Generally, the trough 502 will be filled with water which will give the meats on the collector side of the trough some buoyancy and prevent injury through packing. The air cylinder 506 is a typical double-acting compressed air cylinder, operated by three-way solenoids, and triggered by a micro-switch. This micro-switch is typically located in such a position and manner as to cause ports 508 and 503 to register when the eviscerator container 510 is directly beneath, thus dropping a controlled amount of product into the eviscerator container 510. The eviscerator containers 510 are mounted on a pair of roller chains, not shown, in such a manner as to form a continuous chain of containers traveling around its track within the confines of the eviscerator tank 514. This chain is propelled by the caterpillar drive 516.

Operation of eviscerator 500 is as follow. One adductor muscle and its attached viscera is placed in each container 510, as described above. These containers travel under approximately one foot of salt water S and over the top of a perforated eviscerator plate 518. A high suction head pump (520, FIG. 1) is connected to be in communication with the bottom of the eviscerator plate 518, and in this manner a high negative pressure is obtained and kept in suction chamber 522. As a container 510 passes over the eviscerator plate 518, a roller 524 is caused to rotate by any suitable means, such as, for example, racks and gears generally indicated in FIGS. 14 and 15 at 540 which are mounted in the water at the sides of the assembly. The roller 524 pushes the adductor muscle across the eviscerator plate 518 by rolling it. The perforations or openings of the eviscerator plate 518 in the region of the chamber 522 are of sufficient size to allow only the viscera to pass therethrough and prevent the passage of the adductor muscle.

The adductor muscle assumes a rolling attitude because of its barrel shape. The small roller 526 is driven through friction contact with roller 524. This small roller serves to pinch and hold any trailing viscera that is not removed by the high pressure drop across the slots in the eviscerator plate 518. A shoe plate 528 functions as a slide valve to keep the slots in the evisceration plate 518 which are not actually being used in evisceration at the time covered, therefore cutting down the pump capacity which would otherwise be required. A wire cage 530 prevents the product from floating out of the container in the period before the flow through the evisceration plate sucks the product down. Belt 532 serves to seal the bottom of the container 510 as it enters the water S.

The eviscerated adductor muscle is transported to a region where the perforations in the plate 518 are enlarged in size and the muscle is flushed down a product flush port 534 after the viscera has been removed therefrom. The assembly for collecting the product and the product flushing water typically consists of a sump tank located under flush ports 534 over which passes a flexible mesh conveyor belt. The product is carried then by this belt to an area suitable for manual sorting and culling while the flushing water is collected in sump tank. A pump may be connected to the tank to return the flushing water to tank 500. While pump volume is to be calculated to balance flushing water volume, flushing water quantities will tend to decrease from time to time, so in order to maintain a desirable water level in the sump tank, a float switch could be employed to cycle the associated pump. To avoid the water in the tank 500 from becoming contaminated by an excess of particles of viscera, a relatively large quantity of fresh water is brought in by means of product discharge pan or trough 410. Excess and waste water is drawn off by a drain and overflow which also tends to maintain correct water level. Water from the suction chamber is pumped by the evisceration pump 520 to the top of a viscera removal screen 536 (FIG. 1). The water passes through the screen and re-enters an eviscerator box 538. The viscera is then brushed off the screen by any suitable means and falls into a viscera receptacle 540 for removal to other locations. It must be understood that the water in the eviscerator box 538 returns to the eviscerator tank 514 through a suitable overflow drain to be recycled.

It is obvious that various changes may be made in the form, structure, and arrangement of the parts without departing from the invention. Typically, an alternate method could be employed for passing the bivalves through the shucker assembly 200. The individually spaced bivalves could be dropped through a hard surfaced metal chute. Below the outlet of the chute, there is disposed a pair of spaced apart metal combs and are securely held thereby and carried through heated zone at any desired rate of speed.

We claim:

In an apparatus for sequentially shucking and eviscerating bivalves, means for heating predetermined zones of the bivalves comprising means for orienting and transporting bivalves along a predetermined path, heater means disposed along said predetermined path for simultaneously directing hot gases on predetermined zones of each opposed shell of the bivalves to effect a release of the adductor muscle of the bivalve from the shells thereof, conveying means for transporting the heated bivalve from said heating means to shearing means, and means for shearing the opposed shells of the bivalve from the viscera and adductor muscle thereof, said means for shearing the bivalves including a pair of cooperating rollers having mating cavities for receiving the bivalves, one of said rollers having a larger diameter than the other, and means for driving said rollers at the same r.p.m. causing a difference in the peripheral speed and effecting a shearing action on the bivalves.

References Cited by the Examiner

UNITED STATES PATENTS

| | | | |
|---|---|---|---|
| 2,008,820 | 7/35 | Doxsee et al. | 17—2 |
| 2,047,688 | 7/36 | Jenkins | 17—45 |
| 2,051,676 | 8/36 | Bloedorn | 209—173 |
| 2,102,943 | 12/37 | Cook | 17—2 |
| 2,455,675 | 12/48 | Hawk | 17—3 |
| 2,929,502 | 3/60 | Harris | 209—173 |
| 2,942,292 | 6/60 | Rey | 17—45 |
| 3,070,834 | 1/63 | Carpenter | 17—45 |

FOREIGN PATENTS

| | | |
|---|---|---|
| 551,674 | 3/43 | Great Britain. |

SAMUEL KOREN, *Primary Examiner.*

LUCIE H. LAUDENSLAGER, *Examiner.*